(12) United States Patent
Shingu et al.

(10) Patent No.: US 7,724,277 B2
(45) Date of Patent: May 25, 2010

(54) DISPLAY APPARATUS, SYSTEM AND DISPLAY METHOD

(75) Inventors: Jun Shingu, Kanagawa (JP); Jun Miyazaki, Kanagawa (JP); Toshiya Yamada, Kanagawa (JP); Kazutaka Hirata, Kanagawa (JP)

(73) Assignee: Fuji Xerox Co., Ltd., Minato-ku, Tokyo (JP)

( * ) Notice: Subject to any disclaimer, the term of this patent is extended or adjusted under 35 U.S.C. 154(b) by 952 days.

(21) Appl. No.: 10/993,364

(22) Filed: Nov. 22, 2004

(65) Prior Publication Data
US 2005/0275716 A1  Dec. 15, 2005

(30) Foreign Application Priority Data
Jun. 14, 2004  (JP)  ............................. 2004-175065

(51) Int. Cl.
H04N 7/14  (2006.01)
G06F 7/00  (2006.01)

(52) U.S. Cl. ................. 348/14.08; 348/14.07; 348/14.1

(58) Field of Classification Search ... 348/14.01–14.09, 348/14.1, 14.11–14.16; 707/200, 1; 715/201, 715/255; 345/440
See application file for complete search history.

(56) References Cited

U.S. PATENT DOCUMENTS

| | | | | |
|---|---|---|---|---|
| 5,491,743 A * | 2/1996 | Shiio et al. | ................... | 709/204 |
| 5,572,728 A * | 11/1996 | Tada et al. | ................... | 707/200 |
| 6,205,089 B1 * | 3/2001 | Itoh | ............................. | 368/10 |
| 6,778,807 B1 * | 8/2004 | Martino et al. | .............. | 434/362 |
| 7,079,142 B2 * | 7/2006 | Chiu et al. | ................... | 345/440 |
| 7,133,062 B2 * | 11/2006 | Castles et al. | ............ | 348/14.03 |
| 7,298,930 B1 * | 11/2007 | Erol et al. | .................... | 382/305 |
| 7,313,595 B2 * | 12/2007 | Rust | ........................... | 709/204 |
| 2004/0207724 A1 * | 10/2004 | Crouch et al. | ............ | 348/14.09 |

FOREIGN PATENT DOCUMENTS

| | | | |
|---|---|---|---|
| JP | 6-153155 A | | 5/1994 |
| JP | 06178297 A | * | 6/1994 |
| JP | 06-205151 A | * | 7/1994 |
| JP | 2000125274 A | * | 4/2000 |
| JP | 2003-87725 A | | 3/2003 |
| JP | 2003-168051 A | | 6/2003 |

OTHER PUBLICATIONS

Japanese Office Action, Application No. 2004-175065, dated Jan. 15, 2010.

* cited by examiner

Primary Examiner—Melur Ramakrishnaiah
(74) Attorney, Agent, or Firm—Sughrue Mion, PLLC

(57) ABSTRACT

A display apparatus has an acquisition unit and a display unit. The acquisition unit acquires information of a meeting video and/or the meeting video from a video storage apparatus and the video storage apparatus stores a plurality of meeting videos. The display unit creates a introduction screen for introducing information of the meeting video based on the information acquired by the acquisition unit, and displays the introduction screen on a display surface.

36 Claims, 13 Drawing Sheets

MEETING VIDEO REGISTRATION PROCESSING

FIG. 4

| MEETING | MEETING NAME | PLACE | TIME | PARTICIPANT | MEETING VIDEO | MEETING MATERIAL | ANNOTATION |
|---|---|---|---|---|---|---|---|
| MEETING 1 | MEETING A | OFFICE A, MEETING ROOM A | 5/1 11:00-12:00 | PERSONS 1,3,4,5 | MEETING VIDEO A | MEETING MATERIAL A | ANNOTATION 1, 2 |
| MEETING 2 | MEETING B | OFFICE B, MEETING ROOM B | 5/4 10:00-12:00 | PERSONS 2,3 | MEETING VIDEO B | MEETING MATERIAL B | ANNOTATION 3 |
| MEETING 3 | MEETING C | OFFICE A, MEETING ROOM A | 5/4 15:00-18:00 | PERSONS 1,3,4,5 | MEETING VIDEO C | MEETING MATERIAL A, C | NOTHING |
| MEETING 4 | MEETING D | OFFICE C, MEETING ROOM D | 5/5 14:00-15:30 | PERSONS 6,7,8 | MEETING VIDEO D | MEETING MATERIAL D | ANNOTATION 4, 5, 6 |
| MEETING 5 | MEETING E | OFFICE B, MEETING ROOM D | 5/10 16:00-16:20 | PERSONS 2,4,6 | MEETING VIDEO E | MEETING MATERIAL E, F | NOTHING |

PARTICIPANT DISPLAY EXAMPLE

[LIST DISPLAY]

PARTICIPANT DISPLAY EXAMPLE 2

[SLIDE SHOW DISPLAY]

PARTICIPANT DISPLAY EXAMPLE 3

[SLIDE SHOW DISPLAY ACCORDING TO ATTRIBUTE]

DISPLAY EXAMPLE 3 OF MEETING VIDEO

REPRODUCTION SPEED OF WINDOW IS CHANGED AND DISPLAY IS PERFORMED

DISPLAY APPARATUS, SYSTEM AND DISPLAY METHOD

BACKGROUND OF THE INVENTION

1. Field of the Invention

The present invention relates to a display apparatus, a system, and a display method, and more particularly to a display apparatus, a system and a display method in which plural videos are introduced.

2. Description of the Related Art

Conventionally, there is proposed a system in which videos are read out of an apparatus for storing plural videos taken in meetings or the like and are reproduced, so that an interesting video can be found. In this system, for example, a meeting video and a material relating to the meeting video are registered in a database, and the person in charge informs a person, who may be interested in the meeting video, of the existence of the meeting video by e-mail or the like.

The person who has received the e-mail extracts a file of the video and the material from the database by a personal computer or the like and confirms the content, and can judge whether or not the meeting video is interesting and whether or not it's worth to watch it. As patent documents related to such conventional technique, the following are proposed.

An apparatus disclosed in Japanese Patent Laid-open No. 2003-87725 stores still images used simultaneously with a video synchronously with the video, displays the still images together with the video, and the video and the still images are reproduced and displayed like they were actually performed in the past meeting, so that the content of the meeting can be reviewed.

An apparatus disclosed in Japanese Patent Laid-open No. Hei6-153155 extracts only characteristic frames by a video processing and reproduces them in order to view the video quickly.

However, in the apparatus disclosed in Japanese Patent Laid-open No. 2003-87725, although the video and the still images can be reproduced and displayed like they were actually performed in the past meeting, in order to judge whether or not this meeting is interesting, the whole meeting video must be checked, and there has been a problem that in the case where there are many meetings, it takes time to find an interesting meeting.

The apparatus disclosed in Japanese Patent Laid-open No. Hei6-153155 relates to a general image processing method in which only the characteristic frames are extracted by the image processing and are reproduced in order to quickly view one video, and it is impossible to find an interesting video from plural videos in a short time.

SUMMARY OF THE INVENTION

The present invention has been made in view of the above circumstances and provides a display apparatus, a system and a display method in which an interesting meeting video can be found from plural meeting videos in a short time.

According to an aspect of the present invention, the display apparatus includes an acquisition unit which acquires information related to plural meeting videos from a video storage apparatus storing meeting videos, and a display unit which creates introduction screens, on which information to introduce the respective meeting videos is arranged, for the respective meeting videos on the basis of the information related to the respective meeting videos acquired by the acquisition unit, and successively displays the respective introduction screens on a specified display surface.

According to this invention, since the introduction screens on which the information to introduce the respective meeting videos is suitably arranged are created, and these introduction screens are displayed, it is possible to find an interesting meeting video from plural meeting videos in a short time. Besides, it is possible to give an opportunity to contact the meeting videos to a person who has had no interest and to cause such a person to have an interest in the meeting videos. Incidentally, to successively display includes a case where the respective introduction screens are successively displayed in moving images, and a case where the respective introduction screens are displayed in a slide show. The slide show display is a display method of successively displaying still images on a screen. By this, the user can easily notice an interesting video from the plural meeting videos even if the user does not perform an operation. Besides, since there is a function to select meetings to be displayed, it is possible to prevent a vast number of meeting videos stored in the video storage apparatus from being displayed, and only important meetings can be exhibited to the user.

According to another aspect of the present invention, the display apparatus includes an acquisition unit which acquires information related to a meeting video from a video storage apparatus storing meeting videos, and a display unit which simultaneously displays divided meeting videos obtained by dividing the meeting video acquired by the acquisition unit in plural windows for introducing the meeting video. According to this invention, the divided meeting videos obtained by dividing the meeting video are simultaneously viewed, so that a large amount of video can be viewed in a short time, and therefore, it is possible to judge in a short time whether or not the video is interesting.

According to another aspect of the present invention, the display apparatus includes an acquisition unit which acquires information related to a meeting video from a video storage apparatus storing meeting videos, and a display unit which displays the meeting video acquired by the acquisition unit in plural windows for introducing the meeting video at different reproduction speeds and at the same time. According to this invention, with respect to the same meeting video, for example, it is reproduced in one window at normal speed, and is reproduced in another window at double speed, so that the detailed meeting video and the rough meeting video can be viewed at the same time. By this, an interesting meeting video can be found in a short time.

According to another aspect of the present invention, the display apparatus includes an acquisition unit which acquires information related to plural meeting videos from a video storage apparatus storing meeting videos, and a display unit which displays the plural meeting videos acquired by the acquisition unit at different reproduction speeds and at the same time in plural windows for introducing the meeting videos. According to this invention, with respect to the plural meeting videos, for example, one of them is reproduced in one window at normal speed, and another is reproduced in another window at double speed, so that an interesting meeting video can be found in a short time.

According to another aspect of the present invention, the system includes a video storage apparatus storing information related to a meeting vide, an information processing apparatus for receiving the information related to the meeting video, and the display apparatus as set forth above. According to this invention, introduction screens on which the information to introduce respective meeting videos is suitably arranged are created and these introduction screens are displayed, so that the system in which an interesting meeting video can be found in a short time can be provided.

According to another aspect of the present invention, the display method includes an acquisition step of acquiring information related to respective meeting videos from a video storage apparatus storing plural meeting videos, a creation step of creating introduction screens, on which information to introduce the respective meeting videos is arranged, for the respective meeting videos on the basis of the information related to the respective meeting videos acquired at the acquisition step, and a display step of successively displaying the respective introduction screens created at the creation step on a specified display surface. According to this invention, since the introduction screens on which the information to introduce the respective meeting videos is suitably arranged are created, and these introduction screens are displayed, it is possible to provide the system in which an interesting meeting video can be found in a short time.

According to another aspect of the present invention, the display method includes an acquisition step of acquiring information related to a meeting video from a video storage apparatus storing meeting videos, a division step of dividing the meeting video acquired at the acquisition step into plural meeting videos, and a display step of simultaneously displaying the meeting videos divided at the division step in plural windows for introducing the meeting video. According to this invention, the divided meeting videos obtained by dividing the meeting video are simultaneously viewed, so that a large amount of video can be viewed in a short time, and therefore, it is possible to judge in a short time whether or not the meeting video is interesting.

According to another aspect of the present invention, the display method includes an acquisition step of acquiring information related to a meeting video from a video storage apparatus storing meeting videos, and a display step of displaying the meeting video acquired at the acquisition step at different reproduction speeds and at the same time in plural windows for introducing the meeting video. According to this invention, with respect to the same meeting video, for example, it is reproduced in one window at normal speed, and is reproduced in another window at double speed, so that the detailed meeting video and the rough meeting video can be viewed at the same time. By this, an interesting meeting video can be found in a short time.

According to another aspect of the present invention, the display method includes an acquisition step of acquiring information related to plural meeting videos from a video storage apparatus storing meeting videos, and a display step of displaying the plural meeting videos acquired at the acquisition step at different reproduction speeds and at the same time in plural windows for introducing the meeting videos. According to this invention, with respect to the plural meeting videos, for example, one of them is reproduced in one window at normal speed, and another is reproduced in another window at double speed, so that an interesting meeting video can be found in a short time.

According to the present invention, the display apparatus, the system and the display method in which an interesting meeting video can be found from plural meeting videos in a short time, can be provided.

BRIEF DESCRIPTION OF THE DRAWINGS

Embodiments of the present invention will be described in detail based on the following figures, wherein:

FIG. 4 is a view showing a data structure of meeting information stored in a database;

DETAILED DESCRIPTION OF THE INVENTION

Hereinafter, the best mode for carrying out the present invention will be described by use of embodiments.

EMBODIMENT 1

Figure 1:
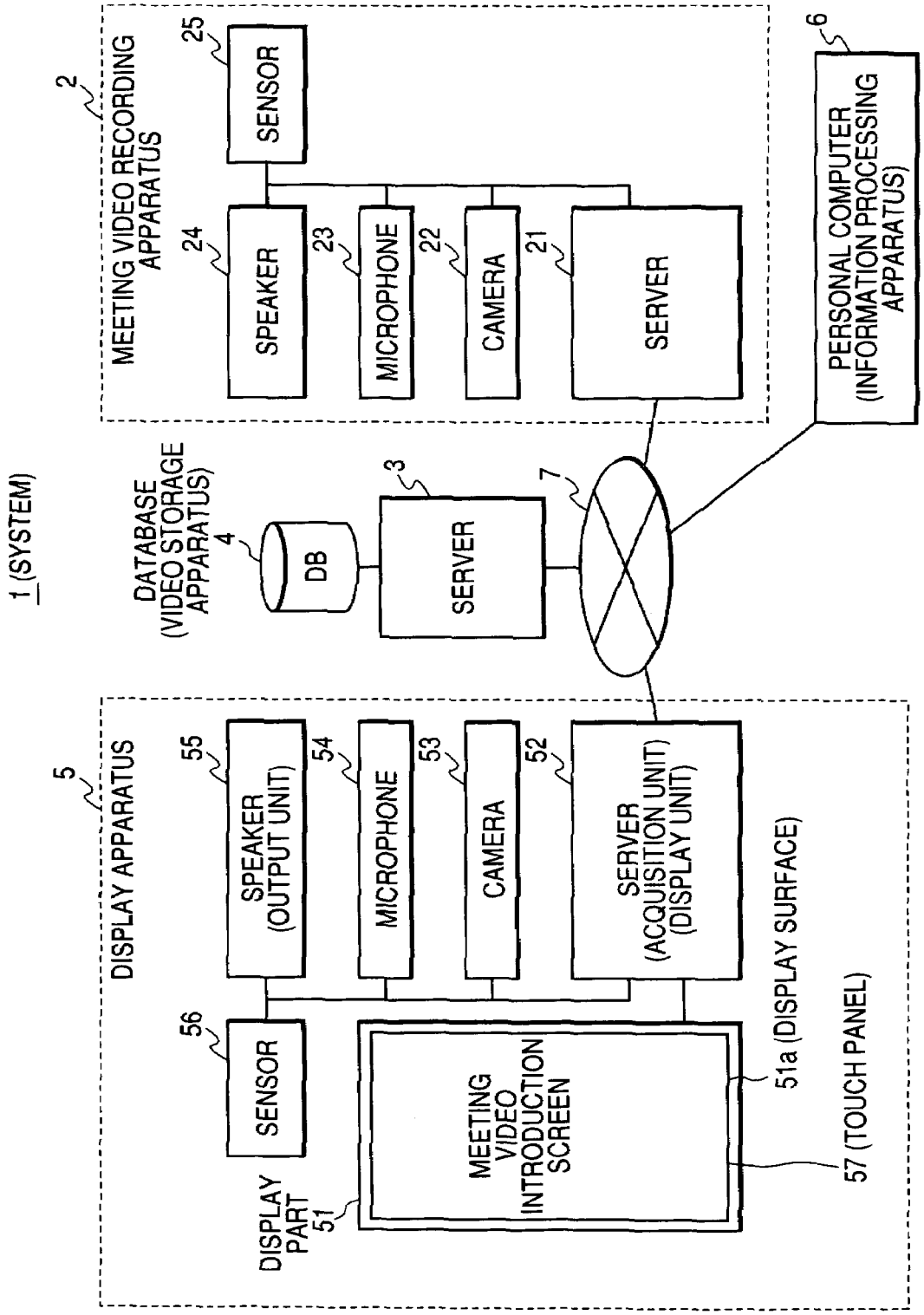
FIG. 1 is a whole structural view of a system according to embodiment 1.

FIG. 1 is a whole structural view of a system according to embodiment 1. As shown in FIG. 1, a system 1 includes a meeting video recording apparatus 2, a server 3, a database 4, a display apparatus 5, and a personal computer 6. The meeting video recording apparatus 2, the server 3, the display apparatus 5, and the personal computer 6 are connected through a network 7. This meeting video recording apparatus 2 which records a meeting includes a server 21, a camera 22, a microphone 23, a speaker 24 and a sensor 25.

The server 21 is constructed by using a CPU (Central Processing Unit), a RAM (Random Access Memory), a ROM (Read Only Memory) and the like. The server 21 sends a video obtained by recording a meeting by the camera 22 and the microphone 23 to the sever 3. The server 3 records the meeting video sent from the server 21 into the database 4.

The database 4 is for recording plural meeting videos and information related thereto. Plural databases 4 as well as one may be dispersed and installed. The network 7 includes, for example, the Internet, a LAN (Local Area Network), a WAN (Wide Area Network) and the like.

The display apparatus 5 includes a display part 51, a server 52, a camera 53, a microphone 54, a speaker 55, a sensor 56, and a touch panel 57. This display part 51 includes a display surface 51a and is constructed of a large display such as a plasma display. Videos stored in the database 4, introduction screens for introducing the videos, and the like are displayed on the display surface 51a of the display part 51. The touch panel 57 is arranged on the display part 51 at a position corresponding to the display surface 51a. A viewer can input various instructions and messages by using the touch panel 57. The information detected by the touch panel 57 is sent to the server 52. Here, although the touch panel 57 is used as an input device, an input device such as a keyboard or a mouse may be used.

The camera 53 is for photographing a viewer viewing the meeting video displayed on the display part 51 and the introduction screen for introducing this meeting video. This camera 53 includes a camera for taking a still image and a moving image. The image taken by the camera 53 is sent to the server 52, and is correlated as an annotation with the meeting video and is registered in the database 4. The microphone 54 acquires the voice of the viewer. The voice from this microphone 54 is sent to the server 52. The speaker 55 reproduces voices in synchronization with images displayed on the display part 51.

The sensor 56 is for detecting the existence of the viewer existing in a specified area. This sensor 56 includes, for example, a distance sensor such as an infrared sensor, a sensor for receiving an RFID (Radio Frequency Identification) attached to a person, and the like. The sensor 56 sends a detection signal to the sever 52 in a case where for example, a distance between the person and the display part 51 is within N meters.

The server 52 controls the whole display apparatus 5. This server 52 is constructed by using, for example, a CPU, a ROM, a RAM and the like. The CPU executes a specified program, so that the display method of this invention is realized. The server 52 acquires information related to respective meeting videos from the data base 4 storing plural meeting videos, creates introduction screens to introduce the respective meeting videos on the basis of the information related to the respective meeting videos, and successively displays the respective introduction screens on the display surface 51a of the display part 51. When an annotation is added to the meeting video or the introduction screen displayed on the display part 51 by handwriting, input from the touch panel 57 or the keyboard, or the photographing of the camera 53, the server 52 correlates it with a corresponding meeting ID and stores it in the database 4.

The personal computer 6 is for looking at the details of the meeting video, and for example, it accesses the database 4 by using the ID of the meeting video, receives the information related to the interesting meeting video, and can display it on a specified display. Besides, when an annotation is added by handwriting, the input from the keyboard, or the photographing of the video, the personal computer 6 correlates it with the corresponding meeting ID and stores it in the database 4. A person who adds the annotation is specified by a login ID to the system, or an RFID tag of the person specified by a predetermined sensor, and is stored, together with the annotation, in the database 4.

Figure 2:
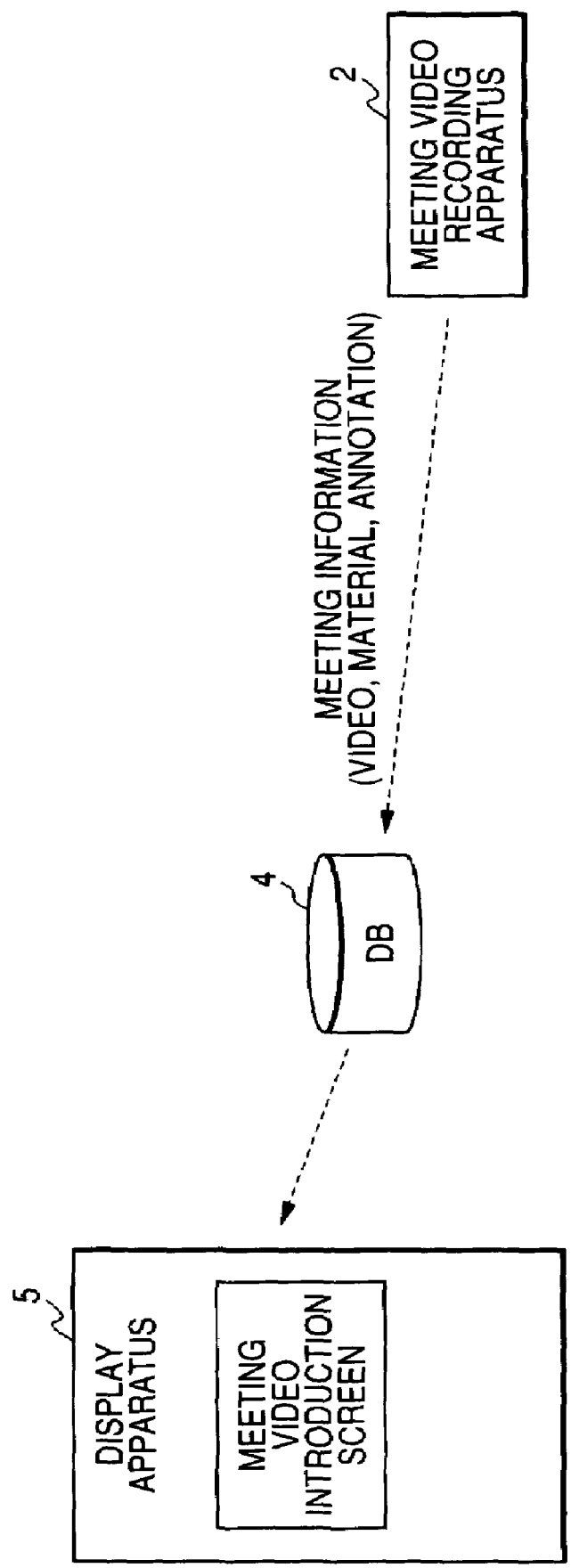
FIG. 2 is a view for explaining the outline of a registration method of a meeting video.

Next, a registration method of a meeting video will be described. FIG. 2 is a view for explaining the outline of the registration method of the meeting video. As shown in FIG. 2, the meeting video recording apparatus 2 registers the meeting video and information related to this meeting video into the database 4. The display apparatus 5 displays the introduction screen of the meeting video registered in this database 4.

Figure 3:
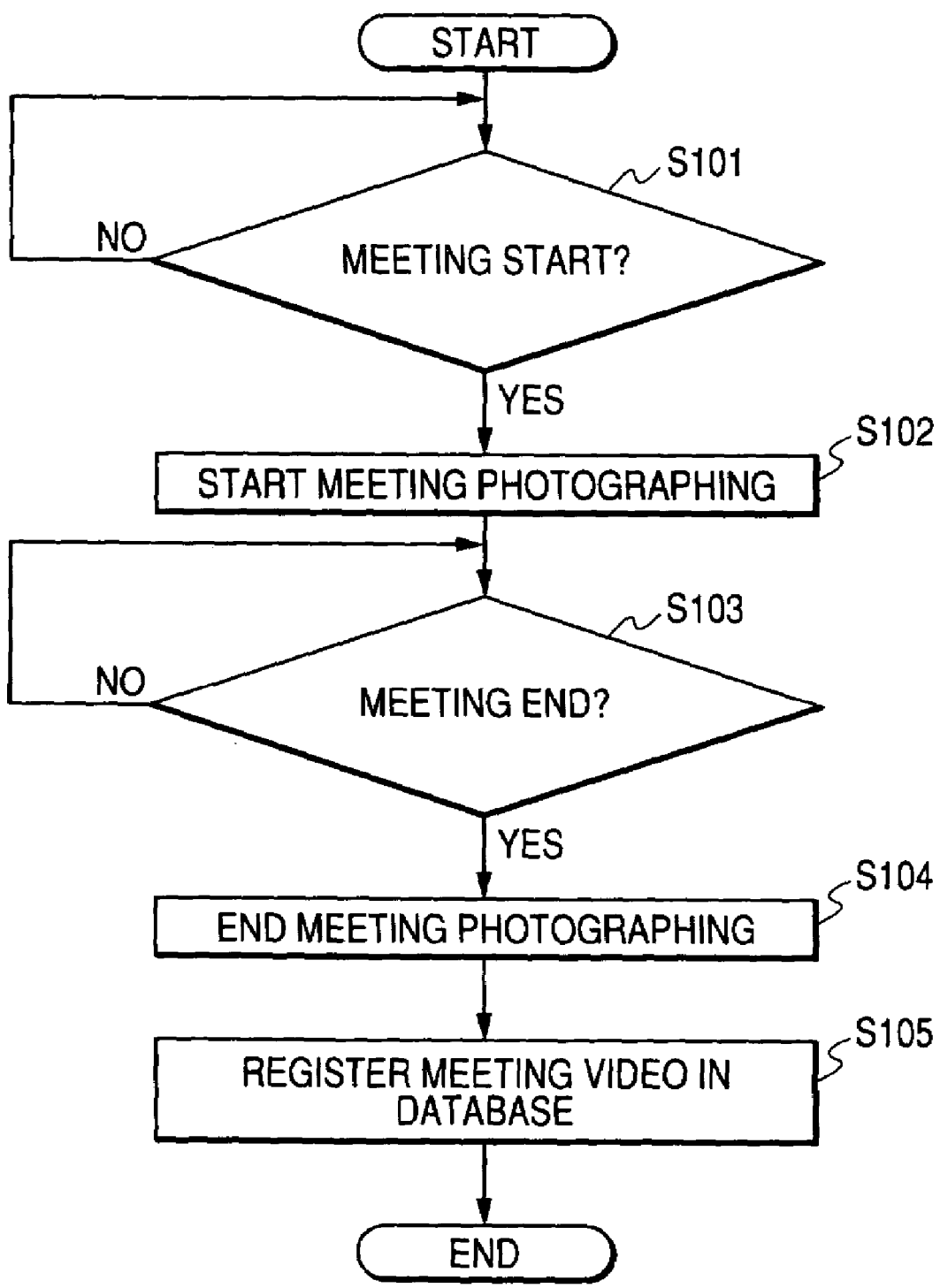
FIG. 3 is a processing flowchart for registering a meeting video.

FIG. 3 is a processing flowchart for registering a meeting video. The processing of registering the meeting video will be described while referring to FIGS. 1 and 2. At step S101, the meeting video recording apparatus 2 judges whether or not a meeting starts, and when detecting that the meeting starts, at step S102, the meeting video recording apparatus starts to photograph the meeting. At step S103, the meeting video recording apparatus 2 judges whether or not the meeting is ended, and when detecting that the meeting is ended, at step S104, the meeting video recording apparatus ends the photographing of the meeting content.

At step S104, the meeting video recording apparatus 2 registers the meeting video through the server 3 into the database 4. Here, when the meeting video is recorded in the database 4 at step S104, the server 21 correlates a date when the meeting is held, a meeting name, a meeting participant name, a photograph of the meeting participant, a meeting material, and an annotation with the meeting video and registers them. This registration may be automatically performed by the meeting video recording apparatus 2, or may be manually performed by a user. Besides, the correspondence between the name of the meeting participant and the face photograph is previously registered in the database 4.

FIG. 4 is a view showing a data structure of meeting information stored in the database. In the example shown in FIG. 4, five pieces of meeting information of from a meeting 1 to a meeting 5 are stored in the database 4. The meeting information is constituted by a meeting name, a place where the meeting is held, a time when the meeting is held, participant information, meeting video information, meeting material information, and annotation information. For example, the meeting information concerning the meeting 1 includes the meeting name "meeting A", the place "office A, meeting room A", the time "May 1, 11:00-12:00", the participant information "persons 1, 3, 4 and 5", the meeting video information "meeting video A", the meeting material information "meeting material A", and the annotation information "annotations 1 and 2".

The meeting material includes a slide, a paper document and the like. The server 21 may automatically register a material projected on a slide from a projector existing in a meeting room into the database 4. In the case of the paper document, the server 21 may scan the paper document and register it in the database 4, or reads an ID tag attached to the paper document by the sensor 25, captures its electric information from a database (not shown) managing the paper document, and may register it in the database 4.

The server 21 automatically registers the meeting video in the database 4 when the meeting is held. In this case, the server 21 detects the on/off of a specified switch by the sensor 25 and judges the start/end time of the meeting. This switch may be a switch for the illumination of the meeting room. Besides, the server 21 detects a tag, such as an RFID held by a person, by the sensor 25, detects the entrance of the person into the meeting room, and may judge the start/end time of the meeting. The server 21 analyzes the video taken by the camera 22 installed in the meeting room to detect the existence of the person present in the meeting room, and may judge the start/end time of the meeting. Besides, the server 21 analyzes the voice picked up by the microphone 23 installed in the meeting room to detect the existence of the person present in the meeting room, and may judge the start/end time of the meeting.

Next, the registration of an annotation will be described. The server 21 correlates the annotation, the person who added the annotation, and the time when the annotation was added with the meeting video and registers them. Here, the annotation is constituted by a handwritten image, a video or a document. The registration of the annotation can also be performed from the display apparatus 5.

Figure 5:
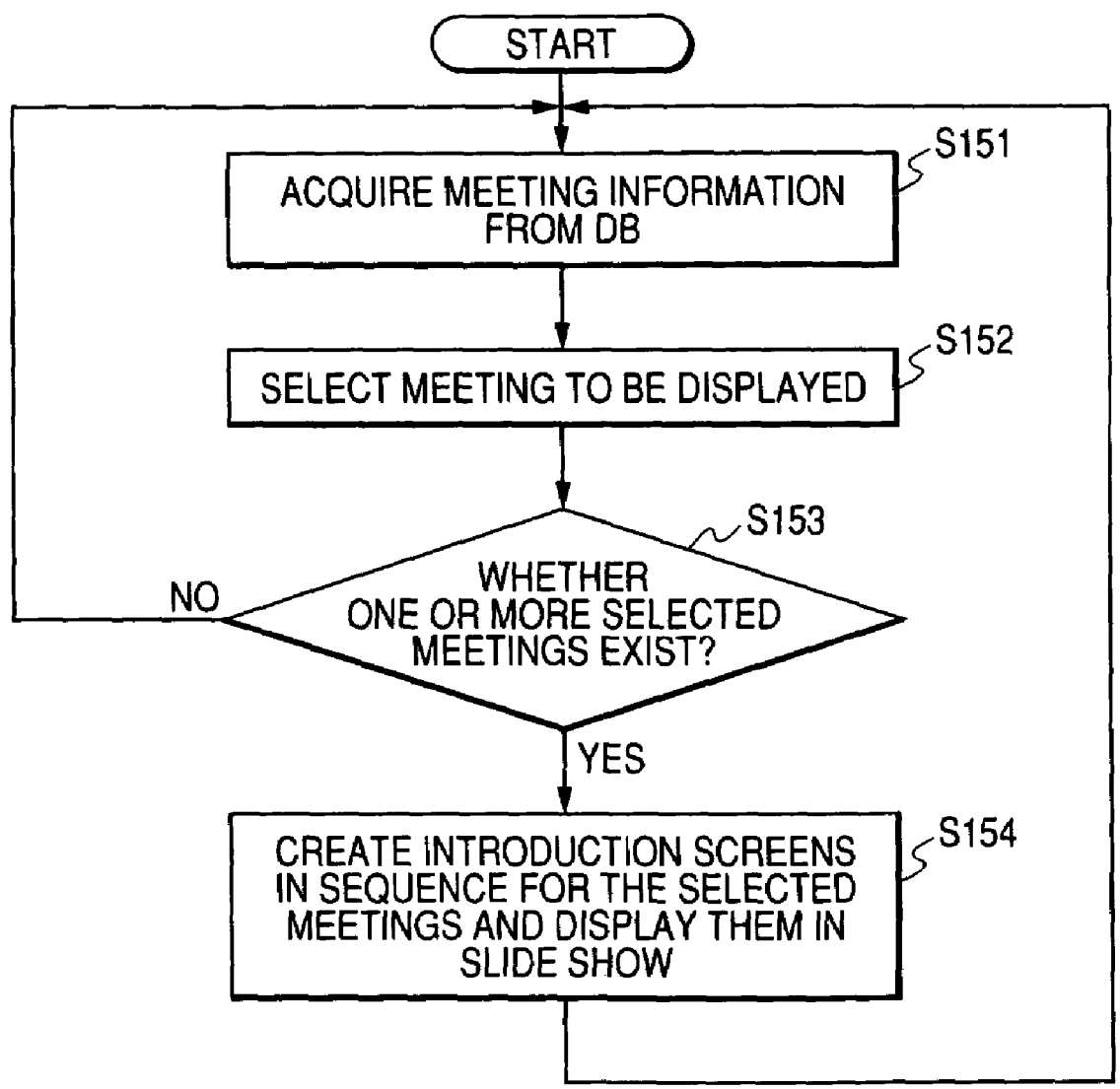
FIG. 5 is a flowchart showing a processing in which meetings to be displayed are selected from plural meetings stored in a data base 4, and introduction screens of the respective meetings are created and are displayed in a slide show.

FIG. 5 is a flowchart showing a processing of selecting meetings to be displayed from plural meetings stored in the database 4, creating introduction screens of the respective meetings and displaying them in a slide show. At step S151, the server 52 captures all meeting information stored in the database 4. At step S152, the server 52 selects a meeting to be displayed from all the meetings. In the case where one or more meetings are selected at step S153, at step S154, the server 52 creates the introduction screens of the respective meetings and successively displays them in a slide show through the display part 51. When all the introduction screens of the selected meetings have been displayed in the slide show, the procedure returns to step S151. At step S152, the server 52 selects the meeting to be displayed from the plural meetings stored in the database 4. The standards of selection are determined from the attributes of the meeting data. For example, the data of dates when the respective meetings are held are used, and the last N meetings are selected and displayed. Alternatively, the importance levels of the respective meetings are calculated, and N meetings having high importance levels are selected and displayed. The calculation of the importance level is performed, based on the attributes of the meeting data, according to a previously determined calculation expression such as, (the novelty of the meeting+the number X3 of the participants of the meeting+the number X2 of the annotations) Here, X2 and X3 indicate weighting parameters. The server 52 of the display apparatus 5 or the server 3 of the database 4 selects the meeting to be displayed from the plural meetings stored in the database 4.

With respect to the timing when the meeting videos are selected, they are fixedly selected according to the previously determined selection standards or algorism, or the selected meeting videos are changed according to a lapse of time, for example, some are selected from the newest ones. Further, meeting videos may be selected for each region. Besides, in accordance with the previously determined selection standards or the algorism and according to the importance levels of the meeting contents, the servers 52 and 3 select the meeting videos to be introduced. As a result, a useful meeting video can be quickly found from a vast number of meeting videos (plural meeting videos). In the case where selection is made according to the importance level, since inspection can be performed according to the importance levels of the meeting videos, a useful meeting video can be found unwastefully and efficiently. Incidentally, when weighting is changed according to the interest of the viewer, a meeting video satisfying the interest of the viewer can be quickly found.

Figure 6:
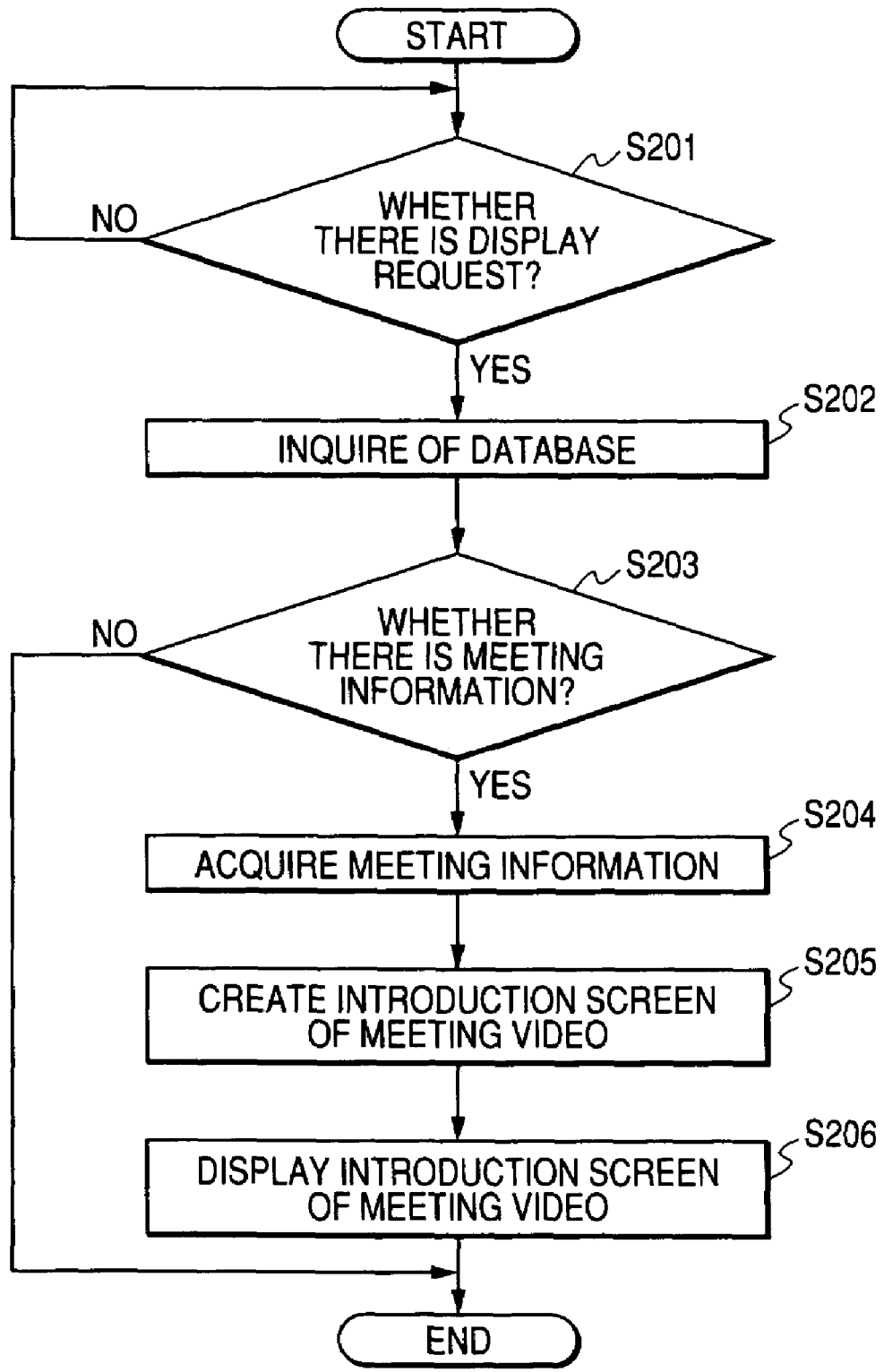
FIG. 6 is a flowchart of a display processing of a meeting video.

Next, a display processing of a meeting video will be described. FIG. 6 is a flowchart showing the display processing of one meeting video. At step S201, the display apparatus 5 detects power on or an operation of an operation part to judge whether or not a display request for an introduction screen of a meeting video has been issued. At step S202, in the case where the display request for the introduction screen of the meeting video has been issued, the server 52 of the display apparatus 5 accesses the database 4 through the server 3 to inquire whether the meeting video is registered. At step S203, in the case where it is judged that the meeting video is registered in the database 4, the display apparatus 5 acquires information related to the meeting video from the database 4 at step S204. At step S205, the server 52 creates the introduction screen of the meeting video on the basis of the information related to the meeting video acquired from the database 4. At step S206, the server 52 displays the created introduction screen of the meeting video on the display part 51.

Figure 7:
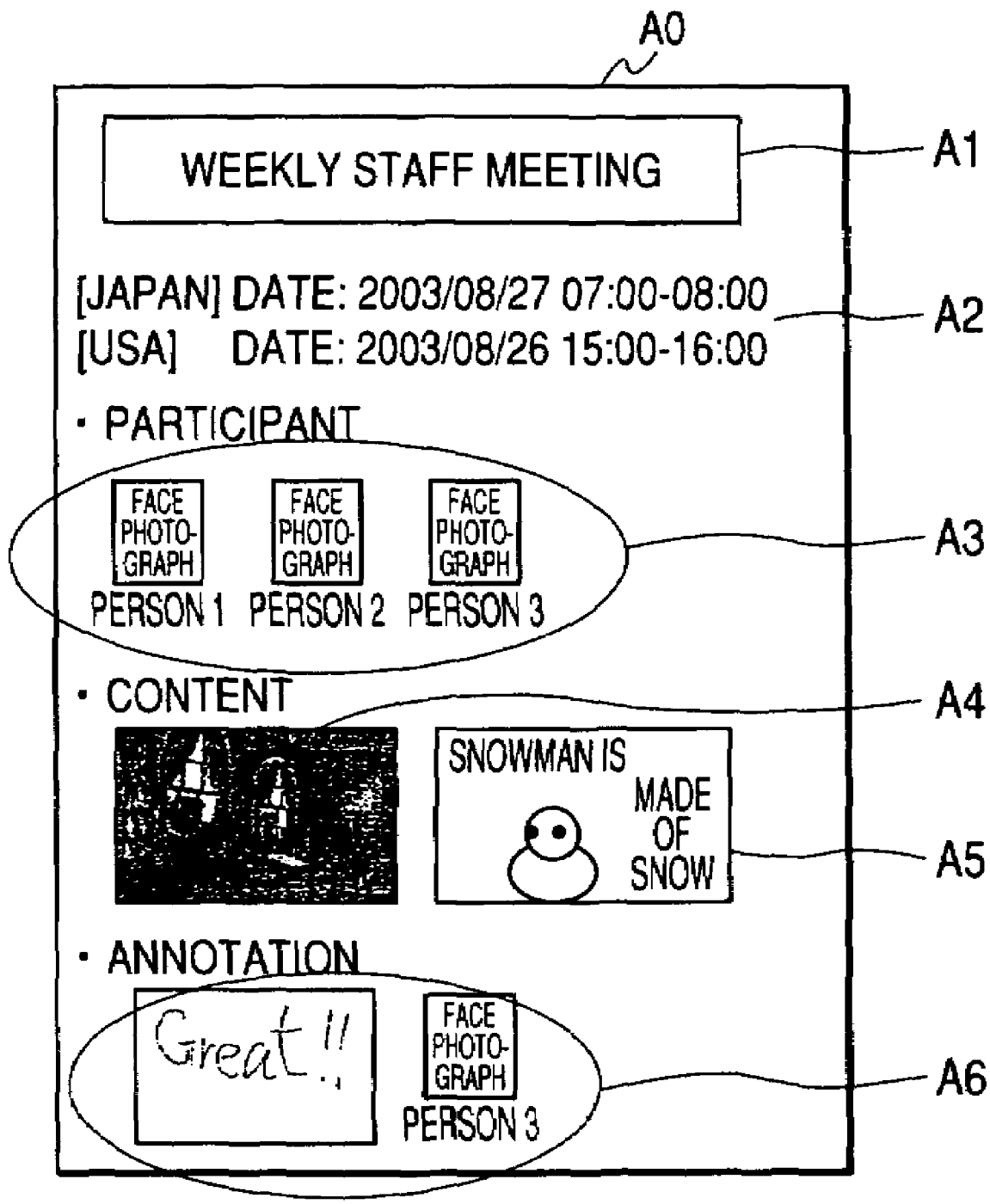
FIG. 7 is a view showing an introduction screen of a meeting video according to embodiment 1.

FIG. 7 shows the introduction screen of the meeting video displayed by the display processing as stated above. As shown in FIG. 7, information to introduce the meeting video is suitably arranged on an introduction screen A0 of the meeting video. The information to introduce the meeting video includes information introducing each video, such as a meeting name A1, a meeting date A2, information A3 of meeting participants, a meeting video A4, a meeting material A5, and annotation information A6. The server 52 displays the meeting name (title of the video) A1 "Weekly Staff Meeting" in a partial area of the introduction screen. By this, the outline of the meeting can be grasped. The server 52 may display a meeting name translated into a specified language in a partial area of the introduction screen A0 simultaneously with or instead of the original meeting name. Here, the translation of the meeting name may be automatically performed by the server 52. Alternatively, the translated meeting name may be stored from the meeting video recording apparatus 2 into the database 4.

The server 52 displays the date "2003/08/26, 15:00-16:00" when the meeting video was taken in a partial area of the introduction screen A0. In the case where the meeting at a place where there is a time difference is displayed, the converted local time of the display apparatus 5 is displayed simultaneously with the local time at the actual place or instead thereof. In the example shown in FIG. 7, the actual meeting is performed in USA at "2003/08/26, 15:00-16:00". The display apparatus 5 is installed in Japan. Thus, the server 52 converts the date "2003/08/26, 15:00-16:00" into the date at the place (Japan) where the introduction screen S0 is displayed and displays "2003/08/27, 7:00-8:00".

Figure 8:
FIG. 8 is a view showing an example in which meeting participants are displayed in a list.

The server 52 displays information (information of the meeting participants) related to persons appearing on the meeting video in a partial area of the introduction screen A0. In the example shown in FIG. 7, as the information of the meeting participants, the names and the face photographs of the meeting participants are displayed in a list. FIG. 8 shows an example in which the meeting participants are displayed in a list. The name of the meeting participant corresponds to the name of the person appearing on the video, and the face photograph of the participant corresponds to the photograph of the person appearing on the video. In the case where the number of participants is large, a slide show display may be used as shown in FIG. 9.

Figure 9:
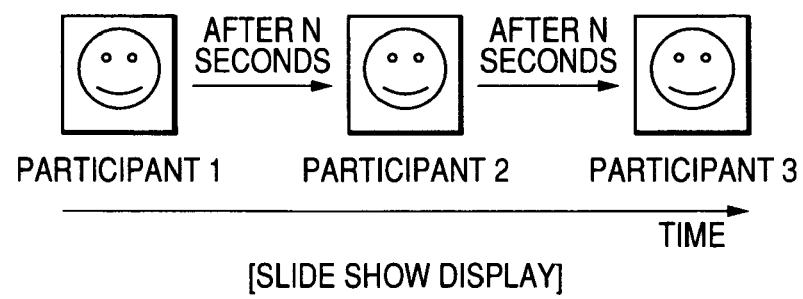
FIG. 9 is a view showing an example in which meeting participants are displayed in a slide show.
Figure 10:
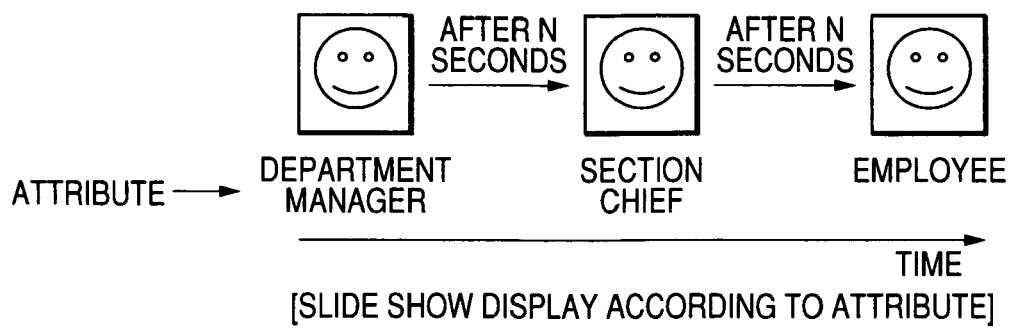
FIG. 10 is a view showing an example in which meeting participants are displayed in a slide show according to their respective attributes.

In FIG. 9, a participant 1 is first displayed, a participant 2 is displayed after N seconds, and a participant 3 is displayed further after N seconds. In this way, when the information related to the meeting participants is displayed in a slide show, even if an area for displaying the information of the meeting participants is a narrow area, a lot of participant information can be displayed. In the case where the number of participants is large, the participant information is classified according to the attributes such as a managerial position, and as shown in FIG. 10, the participant information is displayed in a slide show according to the respective attributes. In the example shown in FIG. 10, first, the participant whose attribute is a department manager is displayed, the participant whose attribute is a section chief is displayed after N seconds, and the participant whose attribute is an employee is displayed further after N seconds. As stated above, the participant information is displayed in a slide show according to the attributes of the meeting participants, so that the meeting participants can be known according to the attributes.

The server 52 reproduces and displays the meeting video A4 in a partial area of the introduction screen A0. By this, by seeing the meeting video itself, it is possible to easily judge whether or not the meeting video is interesting. The server 52 may display a video in which the meeting video is summarized in a partial area of the introduction screen A0. The summarizing of the meeting video may be performed by the server 52 or may be performed by the server 3. The server 52 displays the meeting material A5 in a partial area of the introduction screen A0. This meeting material A5 corresponds to the material related to the video.

The server 52 displays the annotation A6 in a partial area of the introduction screen A0. In addition to the annotation, the name of a person who adds the annotation, its face photograph, and the addition time may be displayed at the same time. In the case where there are many annotations, they may be displayed in a list, in a slide shows, or in a mixture thereof. Here, the server 52 may change the priority order according to the dates when the annotations are added or the attributes of the persons who added the annotations and may display the annotations in a slide show. For example, in the case where the slide show display is performed, the meeting video in which the time when the annotation is added is new is displayed with priority, so that, on the basis of the newest information, it is possible to judge whether or not the meeting video is interesting. Here, the attribute of the person who added the annotation is the managerial position or the like of the person who added the annotation.

Figure 11:
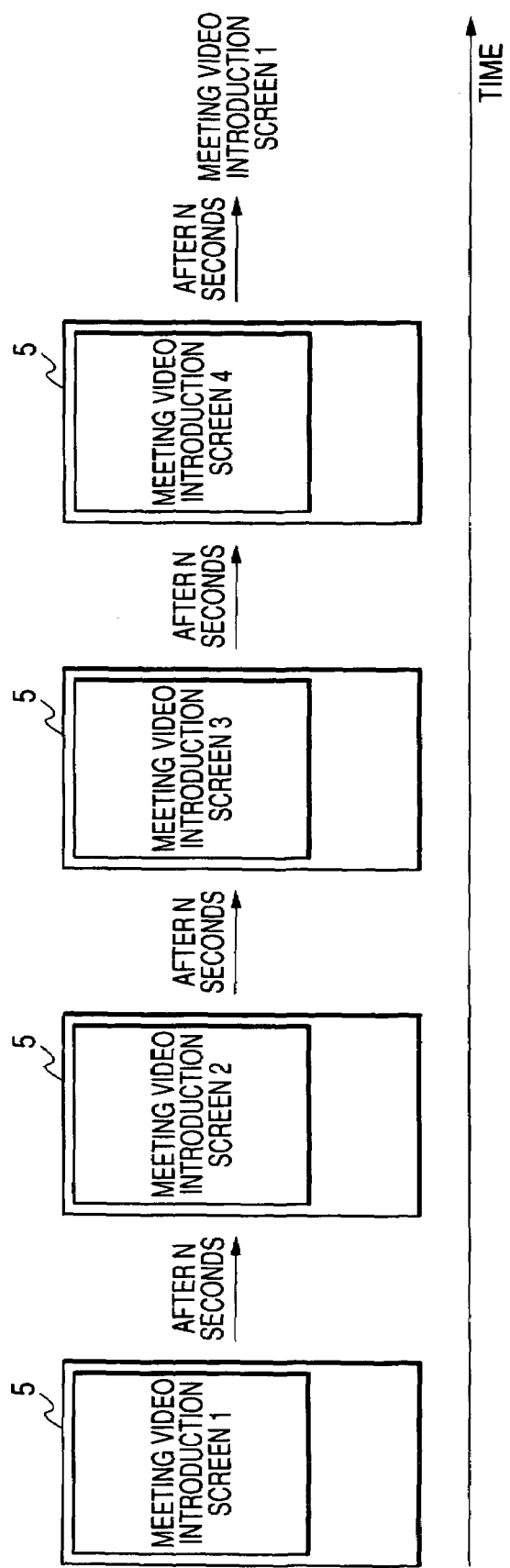
FIG. 11 is a view showing a display example of introduction screens of meeting videos.

Next, a display method of an introduction screen of a meeting video will be described. FIG. 11 is a view showing a display example of an introduction screen of a meeting video. As shown in FIG. 11, the server 52 displays the introduction screen of the meeting video shown in FIG. 7 in a slide show. In FIG. 11, the server 52 first displays an introduction screen 1 of a first meeting video, displays an introduction screen 2 of a second meeting video after N seconds, displays an introduction screen 3 of a third meeting video further after N seconds, displays an introduction screen 4 of a fourth meeting video further after N seconds, and displays the introduction screen 1 of the first meeting video after N seconds. By this, an interesting meeting video can be found in a short time from the plural meeting videos. Besides, it is possible to give an opportunity to contact the meeting videos to a person who has had no interest and to cause such a person to have an interest in the meeting videos.

Here, with respect to the changeover of the introduction screen, the existence of a person is detected through the operation of the touch panel 57, the detection of the RFID by the sensor 56, or the image processing of the server 52 as to an image taken by the camera 53, and the introduction screen may be dynamically changed to next meeting information on the basis of this. Besides, the user may be allowed to specify the introduction screen of meeting information to be displayed. As stated above, the introduction screens of the plural meeting videos registered in the database 4 are displayed in a slide show, so that the user can easily judge whether or not the content of the meeting is useful for the user himself/herself.

Figure 12:
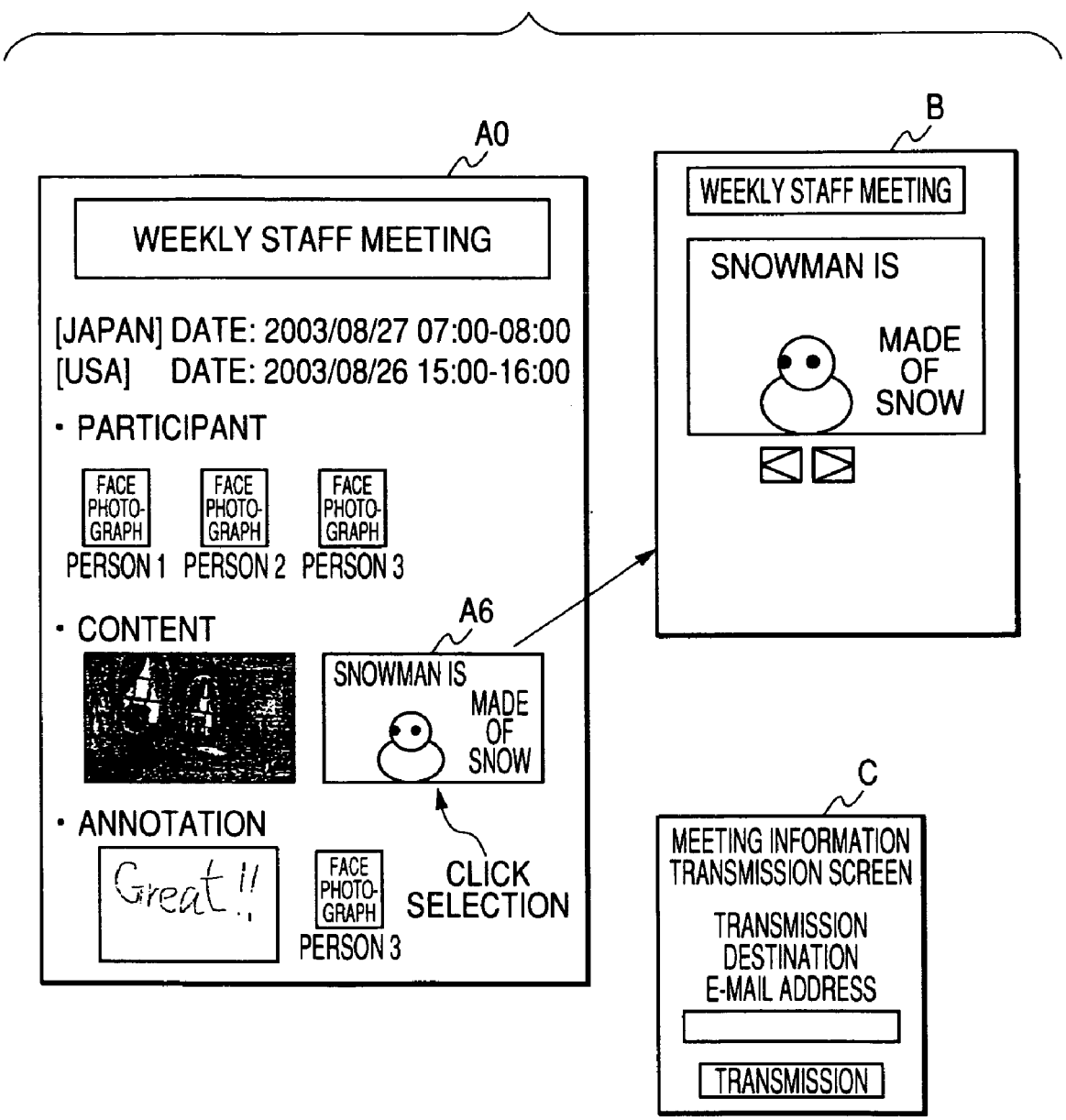
FIG. 12 is a view for explaining an enlarged display and a transmission processing of meeting information to a personal computer.

FIG. 12 is a view for explaining an enlargement display and a transmission processing of meeting information to the personal computer. First, the enlargement display will be described. The server 52 enlarges and displays a place selected by the user in the introduction screen of the meeting video. In FIG. 12, when the user touches the meeting material A6 in the introduction screen A0 of the meeting video, this is detected by the touch panel 57, and the touch position in the introduction screen is transmitted to the server 52. The server 52 enlarges and displays the meeting material A6 in another window B.

By this, an interesting place can be seen in detail. Incidentally, in FIG. 12, although the example in which the meeting material is enlarged has been described, another place in the introduction screen can also be similarly enlarged and displayed. For example, in the case where the selected place is the meeting video A4, the meeting video is enlarged in another window and is reproduced at normal speed. At this time, the voice consistent with the video reproduced in the another window is outputted from the speaker 55.

Next, the transmission processing of meeting information to the personal computer 6 will be described. As shown in FIG. 12, when displaying the introduction screen A0 of the meeting video, the server 52 displays a meeting information transmission screen C. It is assumed that the user finds an interesting meeting video when seeing the introduction screens A0 of the meeting videos. In order to send the ID of the interesting meeting video to the user's personal computer 6, the user uses a keyboard (not shown) to input a transmission destination e-mail address into the meeting information transmission screen C, and uses the touch panel 57 to press a transmission button. Instead of inputting the transmission destination e-mail address by the keyboard, the system senses the RFID of the person by the sensor, or recognizes the face of the person by a video processing technique to specify the person, and may search the database for the mail address of the person.

The server 52 sends the transmission request for the meeting video ID to the server 3. The server 3 refers to the database 4 and sends the meeting video ID to the specified personal computer 6. By this, the user uses the meeting video ID sent from the server 3 later to access the database 4 and can view the interesting meeting video leisurely.

Next, the effects of this embodiment will be described. Conventionally, even if a meeting video and material are registered in a database, in order to notify them, the notification has been made by sending e-mail to a person who may have an interest. The person who has received the e-mail must perform a specified operation on his/her own PC to extract the file of the video and material from the database to see the content. Thus, it takes time to judge whether or not the content of the meeting is useful for himself/herself.

According to this embodiment, the server 52 acquires the information related to the respective meeting videos from the database 4 storing the plural meeting videos, creates the introduction screens to introduce the respective meeting videos on the basis of the information related to the meeting videos, and successively displays the introduction screens on the display part 51. Here, it is assumed that introduction screens of meeting videos of, for example, a group S are made open to the public. Since Mr. K belongs to a group separate from the business of the group S, notification e-mail concerning the meeting of the group S is not usually sent to him. Besides, since Mr. K is busy, he has no time to take the trouble to extract and see the meeting video and material from the database.

When Mr. K happens to pass by the display apparatus 5, it is assumed that the introduction screen of the meeting information of the group S is exhibited. Since the face of the vice present is seen among the face photographs of the participants, and the vice president is speaking on the video, Mr. K feels an interest and sees the display apparatus 5. Also in the meeting material displayed in a slide show, it has been found that there are many interesting drawings, and Mr. K operates the display apparatus 5 to send the ID of this meeting video to his own personal computer 6. Later, Mr. K uses the sent ID of the meeting information to access the database 4, and sees the meeting material and video again, and feels that an idea of the group of Mr. K can be used for the problem of the group S. He proposes this to the group S, and this is adopted so that the problem is solved. As stated above, according to the display apparatus 5, an interesting video can be found in a short time. Besides, it is possible to give an opportunity to contact the meeting videos to a person who has had no interest and to cause such a person to have an interest in the meeting videos.

EMBODIMENT 2

Figure 13:
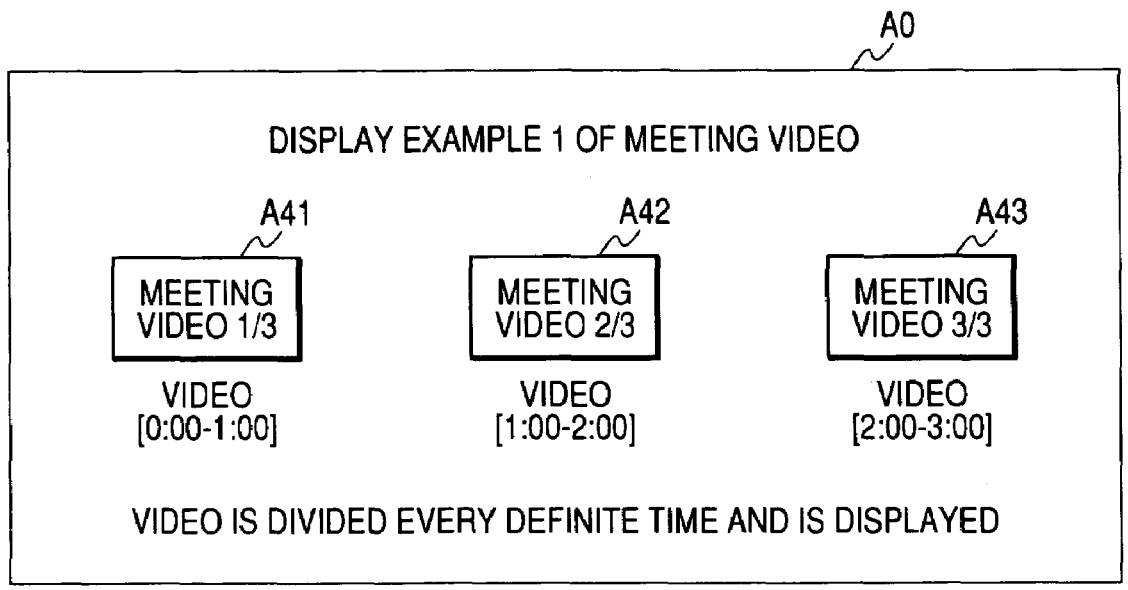
FIG. 13 is a view showing a display example of meeting videos according to embodiment 2.

Next, embodiment 2 will be described. In the embodiment 1, although the description has been given to the example in which the meeting video is displayed in the one window, in the embodiment 2, one meeting video is divided into plural parts, and the respective divided videos are simultaneously displayed in separate windows. FIG. 13 is a view showing a display example of a meeting video. As shown in FIG. 13, the server 52 divides the meeting video into three parts on the basis of the photographing time of the meeting video, and simultaneously displays these divided videos in plural windows A41 to A43 provided in a partial area of an introduction screen A0.

Specifically, in the case where the photographing time of the meeting video is three hours, the server 52 simply divides the meeting video into three videos of a meeting video of from 0 second to 1 hour, a meeting video of from 1 hour and 1 second to 2 hours, and a meeting video of from 2 hours and 1 second to 3 hours, and displays them in the respective windows A41 to A43.

Figure 14:
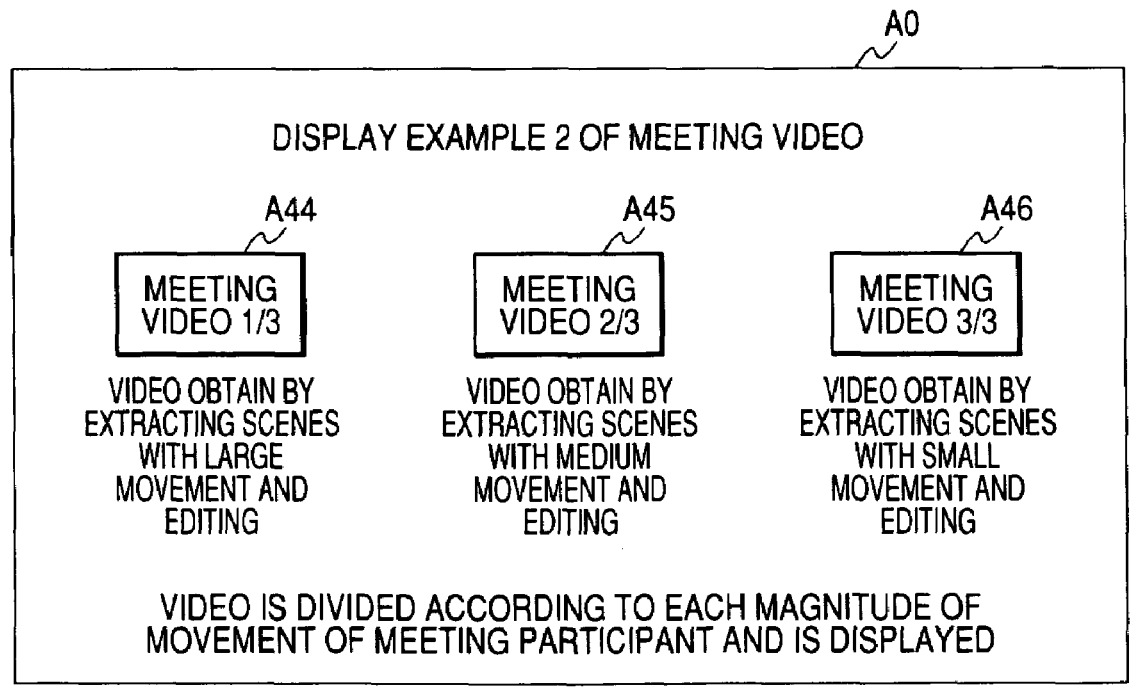
FIG. 14 is a view showing another display example of meeting videos according to embodiment 2.

Next, another display example of a meeting video will be described. FIG. 14 is a view showing another display example of a meeting video. The server 52 divides the meeting video according to the result of a signal processing, such as an image signal processing or a voice signal processing, of the meeting video, and displays the divided meeting videos in plural windows. In the example shown in FIG. 14, the server 52 uses the image processing technique to extract images according to the magnitude of a movement of a meeting participant from the meeting video, divides the meeting video into three videos, displays in a window A44 a meeting video in which scenes with a large movement of the participant are extracted and edited, displays in a window A45 a meeting video in which scenes with a medium movement of the participant are extracted and edited, and displays in a window A46 a meeting video in which scenes with a small movement of the participant are extracted and edited.

The server 52 uses a well-known image processing technique to specify gestures and the like of the meeting participant, and specifies the magnitude of the movement of the meeting participant from the meeting video. Besides, the server 52 applies an image processing to the meeting video to perform the face analysis to specify a speaker, collects videos for each speaker, and may divide the meeting video according to each speaker. For example, videos in which Mr. A speaks are extracted and edited from the meeting video, so that the meeting video in which only Mr. A speaks can be created. By this, the meeting video can be divided according to each speaker.

Incidentally, in the above, although the description has been given to the example in which the meeting video is divided by the image processing, the meeting video may be divided for, for example, each speaker on the basis of a voice analysis. For example, a speaker is specified by using a voice recognition technique, and for example, videos in which Mr. A speaks are extracted and edited, so that the meeting video in which only Mr. A speaks is created. By this, the meeting video can be divided according to each speaker. Besides, the meeting video may be divided on the basis of meta-information attached to the meeting video. For example, the server 52 divides the meeting video by the time in which a slide is displayed on the basis of the meta-information.

According to the embodiment 2, since the videos obtained by dividing the meeting video are respectively displayed in plural windows provided in a partial area of the introduction screen of the meeting video, an interesting video can be found in a short time.

EMBODIMENT 3

Next, embodiment 3 will be described. In the embodiment 3, a meeting video is displayed at different reproduction speeds in respective windows. The meeting videos displayed in the respective windows may be the same meeting video or different meeting videos, or may be the divided videos described in the embodiment 2.

Figure 15A:
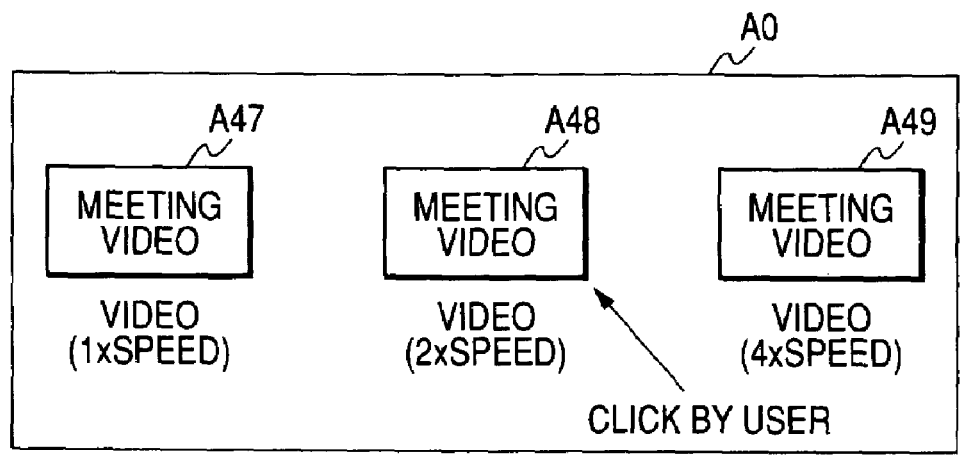
FIGS. 15A and 15B are views showing a display example of meeting videos according to embodiment 3.
Figure 15B:
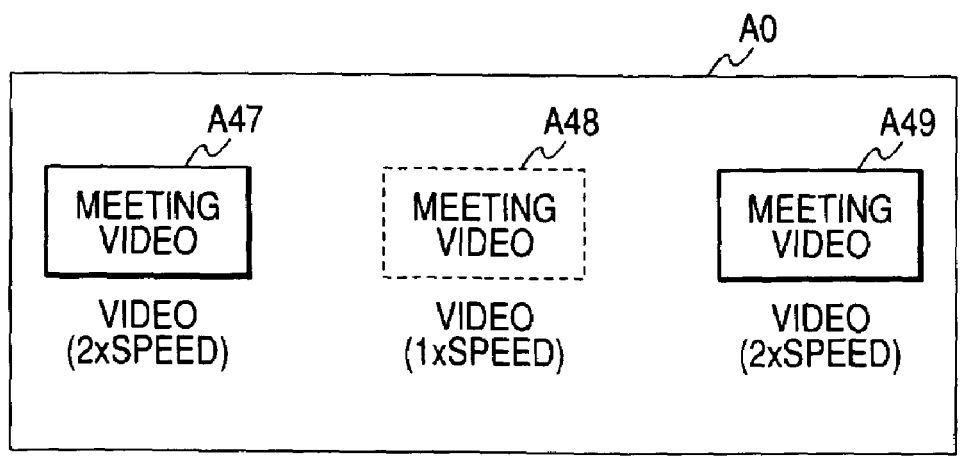

FIGS. 15A and 15B are views showing a display example of a meeting video. As shown in FIG. 15A, in the case where there are plural videos related to respective meeting videos, the server 52 simultaneously displays these videos in plural windows A47 to A49 provided in a partial area of an introduction screen A0 of meeting videos. Besides, the server 52 displays the meeting videos while changing reproduction speed for the respective windows A47 to A49. In the example of the drawing, the meeting video is displayed at 1× speed in the window A47, the meeting video is displayed at 2× speed in the window A48, and the meeting video is displayed at 4× speed in the window A49.

In this state, when the user clicks the window A48 shown in FIG. 15A, the touch panel 57 detects this and outputs this to the server 52. As shown in FIG. 15B, the server 52 displays the meeting video displayed in the window A48 at 1× reproduction speed. The reproduction speed of the meeting video displayed in each window may be reversed. In the case where −1× speed is selected by the user, the server 52 makes reverse rotation, and in the case where −2× speed is selected, the server makes reverse rotation at double speed.

Incidentally, the server 52 may change summary parameters of videos instead of the reproduction speed. Here, a parameter corresponding to 2× reproduction speed becomes such a parameter that the number of frames of the whole video becomes ½ by summarizing. Here, as a parameter, it is possible to use information related to the movement of a person, information in the case where an eminent person is speaking, and the like. When detecting that a specified window is selected from the windows A47 to A49 through the touch panel 57, the server 52 outputs the voice relating to the video displayed in the selected window of the windows A47 to A49 from the speaker 55.

According to the embodiment 3, the server 52 simultaneously displays the same meeting video at different reproduction speeds in the plural windows to introduce the meeting video, or simultaneously display the plural meeting videos at different reproduction speeds in the plural windows to introduce the meeting videos, so that for example, the video which the user desires to see is exhibited at 1× speed in details, and a video which is distant from the selected video in time is exhibited to the user roughly. Besides, since only the touch by the touch panel is sufficient for the operation, the operation is simple.

EMBODIMENT 4

Figure 16:
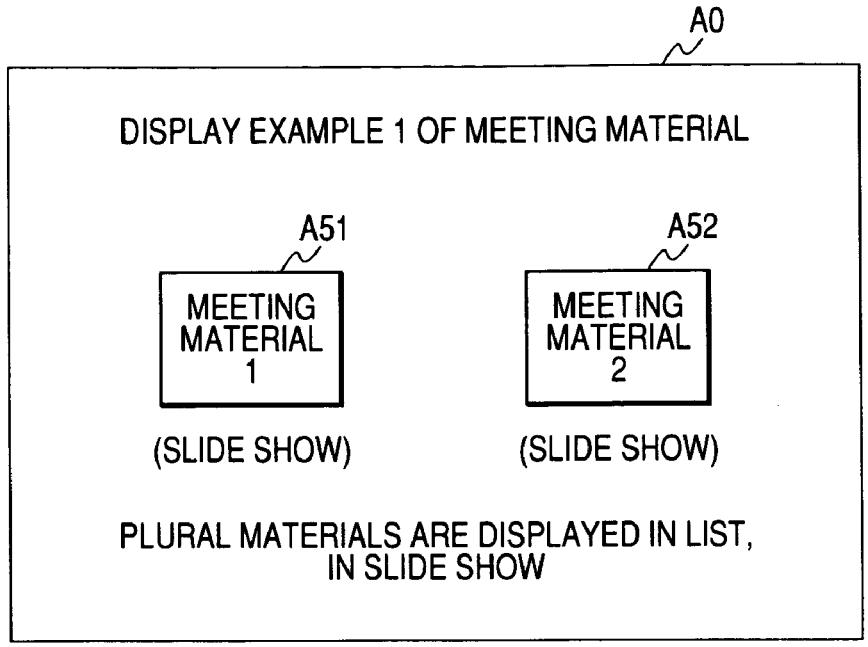
FIG. 16 is a view showing a display example of meeting materials according to embodiment 4.

Next, embodiment 4 will be described. In the embodiment 4, a display example of meeting material will be described. FIG. 16 is a view showing a display example of meeting material. As shown in FIG. 16, in the case where there are plural meeting materials for the meeting video, the server 52 simultaneously displays these meeting materials in plural windows A51 and A52 provided on the introduction screen of the meeting video. At this time, the server 52 displays the meeting materials in a slide show. The server 52 may change the display magnification of the meeting material according to the size of a character or a figure included in the meeting material and displays the meeting material. The server 52 can recognize the size of the character or figure included in the meeting material by using a well-known image processing technique. The server 52 may translate the meeting material into a specified language to display it.

Figure 17:
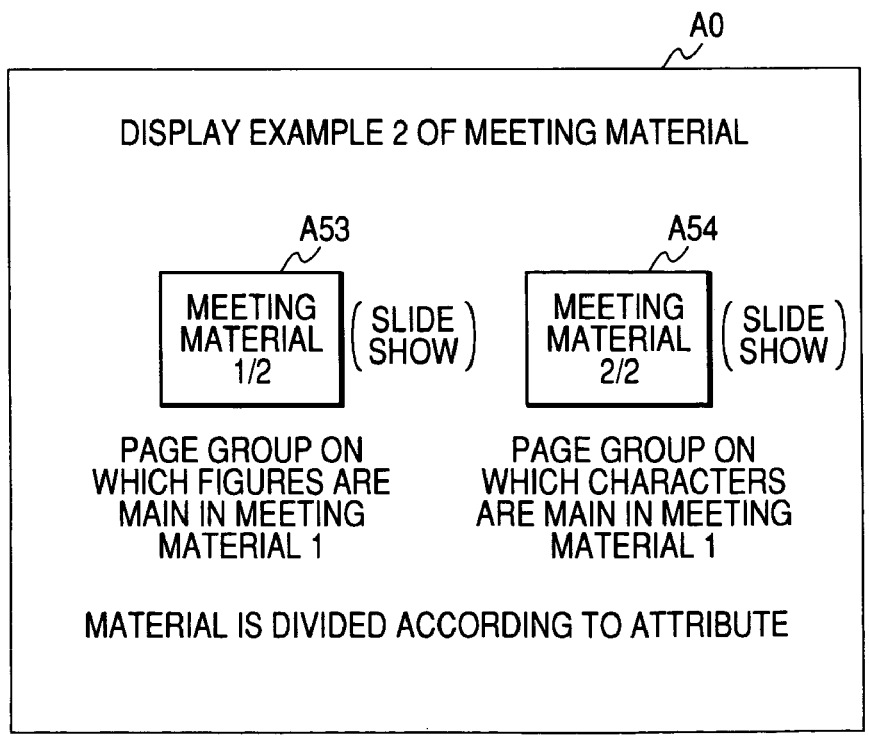
FIG. 17 is a view showing another display example of meeting materials according to embodiment 4.

Next, another display example of meeting material will be described. FIG. 17 is a view showing another display example of meeting material. As shown in FIG. 17, the server 52 divides the meeting materials into parts and simultaneously displays them in plural windows A53 and A54 provided on an introduction screen. At this time, the server 52 uses a well-known document analysis technique to the meeting material to specify pages on which figures are main in the meeting material and pages on which characters are main, and divides the meeting video. In FIG. 17, a page group in which figures are main in the meeting material 1 is displayed in the window A53, and a page group in which sentences are main in the meeting material 1 is displayed in the window A54. The whole meeting materials can be easily grasped by seeing the page group in which the figures are main.

The server 52 may divide the meeting materials by definite pages. The server 52 may divide the meeting video into, for example, character pages and figure pages for each chapter on the basis of attached information of the meeting material, such as meta-information. The server 52 displays the meeting materials displayed in the respective windows A53 and A54 in a slide show at the selected speed. Besides, the server 52 may display the meeting materials displayed in the respective windows A53 and A54 in a slide show at the speed selected by the user.

In the respective embodiments, the server 52 calculates the importance level of each meeting video on the basis of the information related to each meeting video, and according to the importance level of each meeting video, the server may change the display time when the introduction screen is displayed or the number of times of display. For example, in the case where there are introduction screens A, B and C of the meeting video (importance levels of the meeting videos; A>B>C), an element having a higher importance level is left like A+B+C, A+B, and A, so that the number of times of display of the introduction screen is changed. Besides, the server 52 removes pages having low importance levels in the material related to the meeting video and may change the display time of the introduction screen. Here, the server 52 applies the image processing or voice signal processing to the meeting video, extracts, for example, the face of the meeting participant, the voice of the meeting participant, the movement of the meeting participant, and the like in the meeting video, and judges the importance level of the meeting video. Besides, in the case where a moving image, a meeting material and an annotation (note) are successively displayed in the meeting video, the server 52 may display the moving picture, the meeting video and the note in parallel and may change the display time.

In the case where the introduction screen is constituted by a meeting name, a place, a time, participants, a moving image, a material, a note and the like, and in the case of a meeting video having an importance level lower than other meeting videos, the server 52 may omit the material having the low importance level, or may make the moving image have only several distinctive cuts to make simplification so that the display time of the respective introduction screens are changed. As stated above, when the display time of the successively displayed introduction screens or the number of times of display is changed according to the importance level, a useful meeting video can be quickly found from a vast number of meeting videos unwastefully and efficiently.

Incidentally, the server 52 corresponds to the acquisition unit, the display unit, and the division unit in the claims. Besides, the server 52 corresponds to the selection unit which selectively selects the meeting video to be introduced on the introduction screen from the respective meeting videos on the basis of the information related to the respective meeting videos acquired by the acquisition unit, and the calculation unit which calculates the importance levels of the respective meeting videos on the basis of the information related to the respective meeting videos acquired by the acquisition unit. The data base 4, the personal computer 6 and the speaker 55 correspond to the video storage apparatus, the information processing apparatus and the output unit in the claims, respectively. Besides, the server 52 executes the display method in the claims. Incidentally, the meeting includes also a preliminary arrangement performed by a small number of persons, questions and answers in a lecture or the like, and the like.

According to the respective embodiments, the video of the meeting performed in the past, the content used, the annotation and the like are exhibited on the display apparatus 5 such as an electronic display board, so that the outline of the meeting is notified to the person passing by the display apparatus 5, and the inspection can be more performed in a short time. By causing a person to notice the content of the meeting which the person has had no opportunity to know or which has been manually notified, and causing the person to have an interest, the number of persons viewing the content can be increased.

Although the embodiments of the present invention have been described, the invention is not limited to the specific embodiments, and various variations or modifications can be made within the range of the gist of the invention recited in the claims. For example, in the respective embodiments, although the description has been made that the meeting video is used as the video stored in the database 4, the video of the invention is not limited to the meeting video, and for example, a video of a movie is also included.

This invention deals with both still image and moving image.

As described above, In the display apparatus of the present invention, the display apparatus further includes a selection unit which selectively selects a meeting video to be introduced on the introduction screen from the respective meeting videos on the basis of the information related to the respective meeting videos acquired by the acquisition unit. According to this invention, since only the selectively selected introduction screen is displayed, an interesting meeting video can be found further in a short time.

In the display apparatus of the present invention, the display unit displays the meeting video on the introduction screen. According to this invention, since the meeting video is reproduced and displayed on the introduction screen, by seeing the video itself, it is possible to easily judge whether or not the video is interesting.

In the display apparatus of the present invention, the display unit simultaneously displays divided meeting videos obtained by dividing the meeting video in plural windows provided on the introduction screen. According to this invention, since the divided videos obtained by dividing the meeting video are simultaneously seen, it becomes possible to see a large number of meeting videos in a short time, and therefore, it is possible to judge in a short time whether or not this meeting video is interesting.

In the display apparatus of the present invention, the display apparatus further includes a division unit which divides the meeting video acquired by the acquisition unit on the basis of a photographing time of the meeting video, and the display unit simultaneously displays divided meeting videos divided by the division unit in plural windows provided on the introduction screen. According to this invention, the meeting video can be easily divided on the basis of the photographing time.

In the display apparatus of the present invention, the display apparatus further includes a division unit which divides the meeting video acquired by the acquisition unit according to a signal processing result of the meeting video, and the display unit simultaneously displays divided meeting videos divided by the division unit in plural windows provided on the introduction screen. According to this invention, a speaker is specified by using, for example, a video signal processing or a voice signal processing, and the meeting video can be divided according to each speaker.

In the display apparatus of the present invention, in a case where there are plural videos related to the respective meeting videos, the display unit simultaneously displays these videos in plural windows provided on the introduction screen. According to this invention, the plural relevant meeting videos are simultaneously displayed in the plural windows, so that it is possible to judge from plural points of view whether or not the meeting video is interesting.

In the display apparatus of the present invention, the display unit changes reproduction speeds of the videos to be displayed in the windows for the respective windows and displays them.

In the display apparatus of the present invention, the display apparatus further includes an output unit which outputs a voice relating to the video displayed in the window selected from the plural windows. According to this invention, by only listening to the voice of the interesting meeting video, it is possible to judge whether or not the meeting video is interesting.

In the display apparatus of the present invention, the display unit displays a summary meeting video summarizing the meeting video on the introduction screen. According to this invention, since the summary meeting video summarizing the meeting video is reproduced and displayed, the content of the meeting video can be grasped in a short time.

In the display apparatus of the present invention, the display unit displays a material relating to the meeting video on the introduction screen. According to this invention, the material relating to the meeting video is displayed on the introduction screen, so that the content of the meeting video can be easily understood.

In the display apparatus of the present invention, in a case where there are plural materials relating to the meeting video, the display unit simultaneously displays the materials in plural windows provided on the introduction screen. According to this invention, the plural materials are simultaneously displayed on the introduction screen, so that it is possible to judge in a short time whether or not the materials are interesting.

In the display apparatus of the present invention, the display unit displays the materials in a slide show. According to this invention, since the materials relating to the meeting video can be seen in a short time, it is possible to judge in a short time whether or not this meeting video is interesting.

In the display apparatus of the present invention, the display unit changes a display magnification according to a size of a character or a figure included in the material and displays the material relating to the meeting video on the introduction screen. According to this invention, for example, the character or the like is enlarged to such a size that it can be read, and therefore, it is possible to prevent the character of the material from becoming incomprehensible because of excessive smallness thereof, and it is possible to judge whether or not the content of the meeting video is interesting.

In the display apparatus of the present invention, the display unit displays a material relating to the meeting video and translated into a specified language on the introduction screen. According to this invention, it is possible to read the material in, for example, the language determined as the mother language of the place where the display apparatus exists.

In the display apparatus of the present invention, the display unit displays an annotation related to the meeting video on the introduction screen. According to this invention, since the annotation related to the meeting video is displayed on the introduction screen, the content of the video can be grasped on the basis of, for example, third party's impressions.

In the display apparatus of the present invention, the display unit displays the annotation in a slide show while changing priority according to a date when the annotation is added or an attribute of a person who adds the annotation. According to this invention, the user can read annotations in the order of descending importance.

In the display apparatus of the present invention, the display unit displays on the introduction screen a date when the meeting video is taken. According to this invention, since the date when the meeting video is taken is displayed on the introduction screen, it is possible to know at a glance when the meeting video is taken.

In the display apparatus of the present invention, the display unit displays on the introduction screen a date obtained by converting a date when the meeting video is taken into the date of a place where the introduction screen is displayed. According to this invention, since the date when the meeting video is taken is converted into the date of the place where the introduction screen is displayed and is displayed, the photographing time can be known in view of a time difference.

In the display apparatus of the present invention, the display unit displays a title of the meeting video on the introduction screen. According to this invention, the outline of the meeting video can be grasped by the title of the meeting video displayed on the introduction screen.

In the display apparatus of the present invention, the display unit displays on the introduction screen a title of the meeting video translated into a specified language. According to this invention, since the title of the meeting video translated into the specified language is seen, even if the video is taken in a region different in language, the outline of the video can be grasped.

In the display apparatus of the present invention, the display unit displays on the introduction screen information related to a person appearing on the meeting video. According to this invention, to see the information related to the person appearing on the meeting video assists a judgment as to whether or not this video is interesting.

In the display apparatus of the present invention, the information related to the person appearing on the meeting video includes at least a name of the person appearing on the video or a photograph of the person appearing on the video. According to this invention, it becomes easy to recognize who appears by seeing the name of the person appearing on the meeting video or the photograph of the person appearing on the meeting video, and it becomes easy to judge whether or not this meeting video is interesting.

In the display apparatus of the present invention, the display unit displays the information related to the person appearing on the meeting video in a slide show. According to this invention, even in the case where an area for displaying the information related to the person appearing on the meeting video in the slide show is narrow, a lot of participant information can be displayed.

In the display apparatus of the present invention, the display unit displays the information related to the person appearing on the meeting video in the slide show according to an attribute of the person appearing on the meeting video. According to this invention, by seeing the person appearing on the video displayed in the slide show according to the attribute, it is possible to know the person appearing on the video by the attribute.

In the display apparatus of the present invention, the display unit enlarges and displays a selected place on the introduction screen. According to this invention, the user can look at an interesting part in detail.

In the display apparatus of the present invention, the display unit displays an operation screen for transmitting the information related to the respective meeting videos to a specified information processing apparatus. According to this invention, an interesting video can be viewed later and leisurely.

In the display apparatus of the present invention, the display apparatus further includes a calculation unit which calculates importance levels of the respective meeting videos on the basis of the information related to the respective meeting videos acquired by the acquisition unit, and the display unit changes a display time when the introduction screen is displayed or the number of times of display according to the importance levels of the respective meeting videos calculated by the calculation unit. According to this invention, since the display time when the introduction screen is displayed or the number of times of display is changed according to the importance level of the meeting video, with respect to the introduction screen having a high importance level, the display time can be lengthened, or the number of times of display can be made large, and therefore, it becomes easy to find an interesting video.

In the display apparatus of the present invention, the display apparatus further includes a division unit which divides the meeting video acquired by the acquisition unit on the basis of a photographing time of the meeting video. According to this invention, the meeting video can be easily divided on the basis of the photographing time.

In the display apparatus of the present invention, the display apparatus further includes a division unit which divides the meeting video according to a result of a signal processing of the meeting video. According to this invention, for example, a speaker is specified by using an image signal processing or a voice signal processing, and the meeting video can be divided according to each speaker.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-175065 filed on Jun. 14, 2004 including specification, claims, drawings and abstract is incorporated herein by reference in its entirety.

What is claimed is:

1. A display apparatus comprising:
   an acquisition unit that acquires information of separate meeting videos from a video storage apparatus containing a plurality of separate meeting videos; and
   a display unit that creates introduction screens for selecting a meeting video from the plurality of separate meeting videos, the introduction screens comprising a display of introductory information of the separate meeting videos based on the information acquired by the acquisition unit, and successively displays the introduction screens on a display surface.

2. The display apparatus according to claim 1, further comprising:
   a selection unit that selects a meeting video to be introduced on the introduction screen from the respective meeting videos based on the information acquired by the acquisition unit.

3. The display apparatus according to claim 1, wherein the display unit displays the meeting video on the introduction screen.

4. The display apparatus according to claim 1, further comprising:
   a division unit that divides the meeting video acquired by the acquisition unit into segments,
   wherein the display unit simultaneously displays the divided meeting videos segments in a plurality of windows provided on the introduction screen.

5. The display apparatus according to claim 4, wherein the division unit divides the meeting video based on a photographing time of the meeting video.

6. The display apparatus according to claim 4, wherein the division unit divides the meeting video based on a result of signal processing.

7. The display apparatus according to claim 4, wherein the division unit divides a plurality of meeting videos acquired by the acquisition unit, and the display unit simultaneously displays the plurality of meeting videos divided by the division unit in a plurality of windows provided on the introduction screen.

8. The display apparatus according to claim 4, wherein the display unit changes reproduction speeds of the videos to be displayed in the windows for the respective windows and displays them.

9. The display apparatus according to claim 4, further comprising:
   an output unit that outputs a voice relating to the video displayed in a window selected from the plurality of windows.

10. The display apparatus according to claim 1, wherein the display unit displays a summary meeting video summarizing the meeting video on the introduction screen.

11. The display apparatus according to claim 1, wherein the display unit displays a material relating to the meeting video on the introduction screen.

12. The display apparatus according to claim 11, wherein the display unit simultaneously displays a plurality of materials in a plurality of windows provided on the introduction screen.

13. The display apparatus according to claim 11, wherein the display unit displays the materials in a slide show.

14. The display apparatus according to claim 11, wherein the display unit changes a display magnification according to a size of a character or a figure included in the material and displays the material relating to the meeting video on the introduction screen.

15. The display apparatus according to claim 11, wherein the display unit translates the material into a predetermined language and displays the material translated on the introduction screen.

16. The display apparatus according to claim 1, wherein the display unit displays an annotation related to the meeting video on the introduction screen.

17. The display apparatus according to claim 16, wherein the display unit displays the annotation in a slide show according to a date when the annotation is added or an attribute of a person who adds the annotation.

18. The display apparatus according to claim 1, wherein the display unit displays on the introduction screen a date when the meeting video is taken.

19. The display apparatus according to claim 18, wherein the display unit displays on the introduction screen a date, the date is obtained by converting the date when the meeting video is taken into the date of a place where the introduction screen is displayed.

20. The display apparatus according to claim 1, wherein the display unit displays a title of the meeting video on the introduction screen.

21. The display apparatus according to claim 20, wherein the display unit displays the title which is translated into a predetermined language on the introduction screen.

22. The display apparatus according to claim 1, wherein the display unit displays on the introduction screen information related to a person appearing on the meeting video.

23. The display apparatus according to claim 22, wherein the information related to the person appearing on the meeting video includes at least one or more of a name of the person appearing on the video and a photograph of the person appearing on the video.

24. The display apparatus according to claim 22, wherein the display unit displays the information related to the person appearing on the meeting video in a slide show.

25. The display apparatus according to claim 22, wherein the display unit displays the information related to the person appearing on the meeting video in a slide show according to an attribute of the person appearing on the meeting video.

26. The display apparatus according to claim 1, wherein the display unit enlarges and displays a selected part of the introduction screen.

27. The display apparatus according to claim 1, wherein the display unit displays an operation screen for transmitting the information to a predetermined information processing apparatus.

28. A display apparatus comprising:
an acquisition unit that acquires information of a meeting video from a video storage apparatus;
a display unit that creates an introduction screen for selecting a meeting video, the introduction screen comprising a display of introductory information of the meeting video based on the information acquired by the acquisition unit, and displays the introduction screen on a display surface; and
a calculation unit that calculates level of importance of the meeting video based on the information acquired by the acquisition unit,
wherein the display unit changes a display time or the number of times of display based on the level of importance.

29. A display apparatus comprising:
an acquisition unit that acquires information related to separate meeting videos from a video storage apparatus which stores a plurality of separate meeting videos;
a division unit that divides the meeting videos acquired by the acquisition unit into segments; and
a display unit that simultaneously displays the divided meeting videos segments in a plurality of windows for selecting a meeting video segment from one of the plurality of meeting videos as introduction screens comprising a display of introductory information introducing the meeting video.

30. The display apparatus according to claim 29, wherein the division unit divides the meeting video acquired by the acquisition unit based on a photographing time of the meeting video.

31. The display apparatus according to claim 29, wherein the division unit divides the meeting video according to a result of a signal processing of the meeting video.

32. The display apparatus according to claim 29, wherein the display unit displays the meeting video segments at different reproduction speeds and at the same time.

33. A system comprising:
a video storage apparatus that stores information related to separate meeting videos;
an information processing apparatus that receives the information related to the separate meeting videos; and
a display apparatus comprising:
an acquisition unit that acquires information of the separate meeting videos from the video storage apparatus containing a plurality of separate meeting videos; and
a display unit that creates introduction screens for selecting a meeting video from the plurality of separate meeting videos, the introduction screens comprising a display of introductory information of the separate meeting videos based on the information acquired by the acquisition unit, and successively displays the introduction screens on a display surface.

34. A display method comprising:
acquiring information related to separate meeting videos from a video storage apparatus which stores a plurality of separate meeting videos;
creating introduction screens comprising introductory information for selecting a meeting video from the plurality of separate meeting videos that introduces the meeting videos based on the acquired information; and
successively displaying the introduction screens on a predetermined display surface.

35. The display method according to claim 34, further comprising:
dividing the meeting videos into a plurality of meeting video segments; and
simultaneously displaying the meeting video segments of a meeting video in a plurality of windows for introducing the meeting video.

36. The display method according to claim 35, wherein a process of displaying displays the meeting video segments at different reproduction speeds and at the same time in the plurality of windows for introducing the meeting video.

* * * * *